United States Patent Office 3,529,009
Patented Sept. 15, 1970

3,529,009
UNSATURATED NITRILES CONTAINING CARBONYL GROUPS AND PREPARATION THEREOF
Helmut aus der Fünten, Mondorf, and Hermann Richtzenhain, Cologne-Sulz, Germany, assignors to Dynamit Nobel Aktiengesellschaft, a corporation of Germany
No Drawing. Filed Apr. 28, 1967, Ser. No. 637,315
Claims priority, application Germany, Apr. 30, 1966, D 50,009
Int. Cl. C07c *121/30, 121/48, 121/70*
U.S. Cl. 260—464         14 Claims

ABSTRACT OF THE DISCLOSURE

Process of preparing unsaturated carbonyl group containing nitriles of the formula:

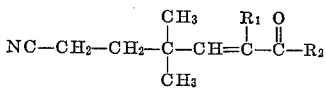

wherein $R_1$ and $R_2$ are each hydrogen, alkyl, cycloalkyl or aryl and can be conjoined to form a ring by reacting $\alpha,\alpha$-dimethyl-$\gamma$-cyanobutyraldehyde with an aldehyde or ketone containing methyl or methylene groups in the presence of a basic condensing agent. The nitriles thus produced are useful compounds and can, for example, be employed as a stabilizer for nitric ester.

---

This invention relates to unsaturated nitriles containing carbonyl groups. More particularly, it relates to the preparation of unsaturated nitriles containing carbonyl groups by the condensation of $\alpha,\alpha$-dimethyl-$\gamma$-cyanobutyraldehyde and an aldehyde or ketone containing methyl or methylene groups in the presence of a basic condensation agent.

The following are illustrative of the aldehydes and ketones which are suitable for condensation with DCBA, in accordance with the invention: aliphatic aldehydes such as acetaldehyde, propionaldehyde, butyraldehyde and the like, and ketones such as acetone, methyl ethyl ketone, methyl isopropyl ketone, methyl isobutyl ketone and the like, cycloaliphatic ketones such as cyclobutanone, cyclopentanone, cyclohexanone, $\alpha$- and $\beta$-tetralones, etc., and aromatic ketones such as acetophenone, p-bromphenyl ethyl ketone, phenyl benzyl ketone, dibenzyl ketone, desoxybenzoin and the like. The latter may contain as substituents on their nuclei, moieties not affected or reactive under the reaction conditions.

In accordance with the invention, it has now been found that unsaturated, carbonyl group-containing nitriles of the formula:

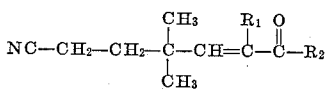

wherein $R_1$ and $R_2$ are each a hydrogen atom, alkyl, cycloalkyl or aryl, or $R_1$ and $R_2$ can be conjoined to form a ring and can be prepared by the condensation of $\alpha,\alpha$-dimethyl-$\gamma$-cyanobutyraldehyde and an aldehyde or ketone containing methyl or methylene groups, in the presence of basic condensing agents.

It is known (Houben-Weyl, vol. 7, part 1, pp. 79–80) (1954) that aldehydes which have a branching at the $\alpha$-carbon atom enter into condensation reactions with other aldehydes (e.g., aldol condensation followed by dehydration) much less readily than those aldehydes which have no branching at the $\alpha$ position. It is obvious to the skilled technical man that the reactivity of an aldehyde is even less when greater branching is present, as in the case, for example, of an aldehyde having an aldehyde group linked to a tertiary carbon atom. When ketones are used instead of aldehydes as reactants for reaction with aldehydes that are branched at the $\alpha$-position, a further retardation of the reaction is to be expected. Accordingly, heretofore, unsaturated condensation products of $\alpha,\alpha$-dimethyl-$\gamma$-cyanobutyraldehyde (DCBA) have been prepared only by utilizing as reactants compounds having highly reactive methylene groups, such as malonic acid or acetoacetic acid. It was not, accordingly, to have been expected that the condensation of $\alpha,\alpha$-dimethyl-$\gamma$-cyanobutyraldehyde with carbonyl compounds which do not have especially activated methyl or methylene groups would take place easily. This was all the more true because of the fact that the methylene group adjacent the nitrile group might enter the reaction, so that a self-condensation of the DCBA would have to be anticipated which would reduce the yield. In case of the use of alkaline condensing agents, a conversion of the DCBA to 5,5-dimethyl-6-oxypiperidone-(2) was also to be expected. Furthermore, in the presence of alkaline condensing agents, there would be no way of preventing the condensation products that might be formed with aldehydes and ketones from being converted into piperidone derivatives the same as the condensation product formed with malonic acid.

It is therefore, surprising that conditions have been found under which $\alpha,\alpha$-dimethyl-$\gamma$-cyanobutyraldehyde can be condensed with an aldehyde or ketone to form the unsaturated carbonyl group-containing nitriles in good yield, the many possible side reactions being suppressed.

In order to successfully carry out the condensation, it was necessary to provide conditions which would exclude insofar as possible any saponification of the nitrile groups. It was established that the use of basic condensing agents under carefully controlled temperature conditions was necessary to this end.

The following are instances of basic condensing agents which have proved suitable for use herein: hydroxides, carbonates, alcoholates, hydrides and amides of the alkali metals, and preferably of sodium or potassium; the hydroxides and alcoholates of the alkaline earth metals such as barium; tertiary amines such as triethylamine; quaternary ammonium compounds such as benzyl trimethyl ammonium hydroxide, as well as known types of basic ion exchangers such as Lewatit M–600 and MP–500, Dowex 1 and Dowex 21K, Duolit A7+A30 and Duolit 101 D, and Permutit ESB. The reaction temperature is preferably maintained between −20° C. and 100° C., a lower condensation temperature being applied when strongly basic condensing agents are involved than in the case of more weakly basic condensing agents. For example, when using potassium hydroxide or sodium alcoholate, it has proven advantageous to operate at temperatures from −10° C. to 40° C. When barium hydroxide is used as the condensing agent, temperatures between 10 and 75° C. have proven most advantageous, and in the case of basic ion exchangers, the preferred temperatures are between 50 and 100° C.

The quantity of basic condensing agent to be used, other than in the case of the basic ion exchanger, is between 0.03 and 5 mole-percent, and preferably between 0.08 and 3 mole-percent with reference to the DCBA. The amount of basic ion exchanger can vary widely, according to whether the ion exchanger is added to the mixture of reactants or whether the mixture of reactants is continuously fed through a reactor filled within ion exchanger. The basic exchanger remains active for a long time and, if desired, can be regenerated according to the conventional methods.

The condensation can be carried out with the stoichiometric amount of the ketone, but an excess of aldehyde or ketone can also be used. The presence of an inert solvent, such as an ether, or aromatic hydrocarbon, is sometimes advantageous.

The following unsaturated aldonitriles and ketonitriles can be prepared by the process of the invention, although the invention is clearly not to be restricted to these:

4,4-dimethyl-6-cyanohexene-(2)-al-(1),
2,4,4-trimethyl-6-cyanohexene-(2)-al-(1),
4,4-dimethyl-2-phenyl-6-cyanohexene-(2)-al-(1),
5,5-dimethyl-7-cyanoheptene-(3)-one-(2),
3,5,5-trimethyl-7-cyanoheptene-(3)-one-(2),
2,6,6-trimethyl-8-cyanoctene-(4)-one-(3),
phenyl-(3,3-dimethyl-5-cyanopentene-(1)-yl) kentone, and
2-(2,2-dimethyl-4-cyanobutylidene) cyclohexanone.

The compounds manufactured according to the invention can be used as stabilizers, e.g., for nitric ester.

The yields in the case of the above-named condensation products are usually greater than 60% with reference to the amount of reacted DCBA.

of 95 to 98°C. The 2,4-dinitrophenylhydrazone was precipitated by the addition of the alcoholic solution of the dimethylcyanoheptenone of a solution of 2,4-dinitrophenylhydrazine in phosphoric acid and ethyl alcohol. M.P. 144° C. (after recrystallization from ethanol).

EXAMPLE 5

1250 g. of DCBA was heated to 40° C. with 870 g. of acetone in a flask equipped with an agitator, a reflux condenser and a dropping funnel. At this temperature, a dispersion of 30 g. of $Ba(OH)_2$ in 110 g. of water was added with strong agitation in such a manner that the temperature did not exceed 40° C. After a total of 25 hours at 40° C., the mixture was cooled. The barium hydroxide was then precipitated by the introduction of carbonic acid as a carbonate, filtered and washed with acetone. Acetone and water were removed from the filtrate by distillation at normal pressure and small amounts of DCBA along with residual water were removed by distillation at 40° C. and 0.5 torr.

From the residue amounting to 1360 g., a distillable fraction of 823 g. was separated by means of a rotating evaporator at 195° C. and 0.5 mm. [Hg]. The separated

| Ex. No. | Moles of DCBA | Moles of aldehyde or ketone | Mole-percent of condensing agent (with ref. to DCBA) | Moles of solvent | Condensation Temp. (° C.) | Time (Hr.) | Percent of DCBA reacted | Yield as percent of reacted DCBA |
|---|---|---|---|---|---|---|---|---|
| 1 | 10 | 13.5 of acetone | 0.8 KOH | | 20 | 5.5 | 48 | a 55.9 |
| 2 | 10 | 10 of acetone | 0.5 KOH | | 5 | 8 | 63 | 61.1 |
| 3 | 1 | 1 of acetone | 6.6 $Na_2CO_3$ | 1.39 $H_2O$ | 74–82 | 8 | 24 | 59.2 |
| 4 | 1 | do | 0.6 of benzyl dimethyl ammonium hydroxide | | 40 | 5 | 44 | 54.2 |
| 5 | 10 | 15 of acetone | 1.75 $Ba(OH)_2$ | 5.55 $H_2O$ | 40 | 25 | 76 | 42.0 |
| 6 | 1 | 1 of acetone | 0.42 $NaOCH_3$ | 0.1 $CH_3OH$ | 30 | 6 | 91 | 40.5 |
| 7 | 1 | do | 0.1 KOH | 2 $C_6H_6$ | 25 | 5 | 78 | 60.5 |
| 8 | 1 | do | 0.05 potassium tert-butylate | | 30 | 6 | 88 | 59.1 |
| 9 | 10 | 10 of acetone | Lewatit M-600 | | 77–83 | 4 | 70 | b 58.0 |
| 10 | 10 | 10 of methyl ethyl ketone | 0.9 KOH | | 30 | 2.5 | 79 | c 52.0 |
| 11 | 1 | 1.1 of methyl isopropyl ketone | 0.1 KOH | | 20 | 8 | 80 | d 60.5 |
| 12 | 1 | 1 of methyl isobutyl ketone | 3.5 KOH | | 40 | 7 | 66.5 | e 56.8 |
| 13 | 1 | 1 of acetophenone | 3.5 KOH | | 40 | 6 | 60 | f 70.0 |
| 14 | 1 | 1 of acetone | 2 NaH | | −5 | 2.5 | 50 | g 33.0 |
| 15 | 1 | 1 of acetone | 2.5 $NaNH_2$ | | −10 | 5 | 44 | 36.1 |
| 16 | 3 | 3.2 of acetaldehyde | 0.66 KOH | | 30 | 6 | 16 | 65 | a 5,5-dimethyl-7-cyanoheptene-(3)-one-(2). B.P.$_{10}$: 95–96° C.; $C_{10}H_{15}NO$ (mol. wt. 165). Calc'd (percent): C, 72.7; H, 9.1; N, 8.5. Found (percent): C, 72.46; H, 9.22; N, 8.46. 2,4-dinitrophenylhydrazone M.P. 144° C. (recrystallized from ethanol): Calc'd (percent): N, 20.25; Found (percent): N, 20.30.

b 9.5% of the reacted DCBA was isolated in the form of 5,5-dimethyl-6-acetonylpiperidone-(2) (M.P. 105° C. recrystallized from cyclohexane). $C_{10}H_{17}NO_2$ (mol. wt. 183). Calc'd (percent): C, 65.5; H, 9.30; N, 7.65. Found (percent): C, 65.75; H, 9.45; N, 9.29.

c 3,5,5-trimethyl-7-cyanoheptene-(3)-one-(2). B.P.$_{0.5}$: 109° C.; $C_{11}H_{17}NO$ (mol. wt. 179). Calc'd (percent): C, 73.7; H, 9.50; N, 7.83. Found (percent): C, 74.09; H, 9.90; N, 7.57.

d 2,6,6-trimethyl-8-cyanoctene-(4)-one-(3). B.P.$_{0.2}$: 140–142° C.; $C_{12}H_{19}NO$ (mol. wt. 193). Calc'd (percent): C, 74.6; H, 9.84; N, 7.25. Found (percent): C, 74.28; H, 10.2; N, 7.87.

e 2,7,7-trimethyl-9-cyanononene-(5)-one-(4) or 3-isopropyl-5,5-dimethyl-7-cyanoheptene-(3)-one-(2). B.P.$_{0.2}$: 156–158° C.; $C_{13}H_{21}NO$ (mol. wt. 207). Calc'd (percent): C, 75.36; H, 10.15; N, 6.76. Found (percent): C, 75.23; H, 10.17; N, 6.69.

f Phenyl-(3,3-dimethyl-5 cyanopentene-(1)-yl)-ketone. B.P.$_{0.4}$: 174–178° C.; $C_{15}H_{17}NO$ (mol. wt. 227). Calc'd (percent): C, 79.2; H, 7.50; N, 6.16. Found (percent): C, 79.14; H, 7.66; N, 6.73.

g 4,4-dimethyl-6-cyanohexene-(2)-al-(1). B.P.$_{12}$: 163–166° C.; $C_9H_{13}NO$ (mol. wt. 115). Calc'd (percent): N, 9.28. Found (percent): N, 9.42.

The condensation and purification processes used in Examples 1, 5, 9 and 16 are described hereinafter by way of exemplification.

EXAMPLE 1

1250 g. of α,α-dimethyl-γ-cyanobutyraldehyde (DCBA) was mixed with 780 g. of acetone in a sulfation flask provided with an agitator which was kept running at a good speed. 15 g. of 30% aqueous solution of KOH was slowly dripped into the flask with cooling. The dripping in of the KOH was so controlled that, under continuous external cooling by running water, the reaction temperature did not exceed 20° C. After a short reaction time (30 min.) the mixture assumed a yellowish color. After 5½ hours the mixture was acidified with HCl (diluted 1:1) to a pH of 5, the salt was washed out with water, and the remaining organic phase fractionated "in vacuo." The first runnings, consisting of residues of acetone, water and some DCBA, were drawn off with a water-jet vacuum pump, and the remainder distilled at 4 torr. Between 43 and 95° C., most of the unreacted DCBA (633 g.) passed over and, after a small intermediate fraction amounting to 38 g. had distilled over at 95 to 125° C., the crude 5,5-dimethyl-7-cyanoheptene-(3)-(2) remaining boiled at 120 to 180° C. By fractionation through a column, 440 g. of dimethyl cyanoheptenone was obtained, having a BP$_1$ fraction consisted of 300 g. (2.4 moles) of unreacted DCBA and 523 g. of 5,5-dimethyl-7-cyanoheptene-3-(2).

EXAMPLE 9

400 ml. of Lewatit M-600 ion exchanger (freshly activated with 10% NaOH and washed with water), 1250 g. of DCBA and 580 g. of acetone were heated in a flask having a reflux condenser and an agitator. Refluxing began at a sump temperature of 77° C. A sump temperature of 83° C. was reached after 4 hours and then the mixture was cooled down and filtered off from the ion exchanger. Thereafter the lowest-boiling fractions were removed by distillation with a water-jet vacuum pump to a sump temperature of 90° C. Fractionation was then carried out at 3 torr, 300 g. of unreacted DCBA (2.4 moles) were obtained between 60 and 90° C., and between 90 and 150° C., 632 g. of crude 5,5-dimethyl-7-cyanoheptene-(3)-one-(2) were recovered. From the latter, 610 g. of pure substance were obtained having a BP$_1$ of 94 to 98° C. Above 150° C., 110 g. of a viscous substance distilled out (most of it at 180° C. and 1 torr), which hardened in a crystallized manner in the receiver, and which following recrystallization from cyclohexane, melted at 105° C. The infra-red spectrum indicated the presence of piperidone.

EXAMPLE 16

375 g. of DCBA was mixed at −5° C. with 2.24 g. of 50% KOH in a flask provided with a dropping funnel, an agitator and a reflux condenser, and which had been installed in a cooling bath and then 140.8 g. of freshly distilled acetaldehyde was dripped in over a period of 4 hours in such a manner that the reaction temperature of 30° C. was not exceeded. After an additional 2 hours at 30° C., the mixture was acidified slightly (pH 5) with dilute hydrochloric acid. After the addition of 30 ml. of $H_2O$ and 50 ml. of benzene, the organic phase was separated off. The aqueous phase was extracted three more times by shaking with 50 ml. of benzene each time, and the combined benzene solutions were fractionated through a short column.

Following removal of unreacted acetaldehyde, adherent water and benzene under normal pressure, 315 g. of DCBA were recovered at $BP_{15}$ 115 to 125° C. (corresponding to a conversion of 16%). Following a brief first-runnings period, 47.1 grams passed over at a $BP_{12}$ of 163 to 166° C. (yield 65% of the theory with reference to reacted cyanobutyraldehyde).

The types of known basic ion exchange resins listed in col. 2, are of the following chemical nature:

Lewatit M–600 is a very strong basic ion exchange resin on the basis of polystyrene.

Lewatit MP–500 is an extremely strong basic ion exchange resin on the basis of polystyrene as well.

Dowex 1 is a polymerisate of styrene with divinyl benzene bearing trimethyl benzyl ammonium groups.

Dowex 21K has the same chemical nature.

Duolit A7 is a phenolic resin with secondary amine groups.

Duolit A30 is an epoxy polyamine resin with tertiary and quaternary amine groups.

Duolit 101 D is a polystyrene resin with tertiary amine groups.

Permutit ESB is a cross-linked polystyrene resin with quaternary ammonium groups.

We claim:
1. An unsaturated carbonyl group containing nitrile of the formula:

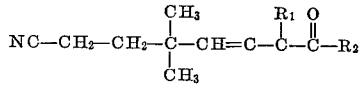

wherein $R_1$ and $R_2$ are each a member selected from the group consisting of hydrogen, alkyl containing 1 to 4 carbon atoms, phenyl, and benzyl and wherein $R_1$ and $R_2$ together can be cojoined to form a cyclobutyl, cyclopentyl or cyclohexyl ring.

2. An unsaturated carbonyl group containing nitrile according to claim 1 designated 4,4-dimethyl-6-cyano-hexene-(2)-al-(1).

3. An unsaturated carbonyl group containing nitrile according to claim 1 designated 2,4,4-trimethyl-6-cyano-hexene-(2)-al-(1).

4. An unsaturated carbonyl group containing nitrile according to claim 1 designated 4,4-dimethyl-2-phenyl-6-cyanohexene-(2)-al-(1).

5. An unsaturated carbonyl group containing nitrile according to claim 1 designated 5,5-dimethyl-7-cyanoheptene-(3)-one-(2).

6. An unsaturated carbonyl group containing nitrile according to claim 1 designated 3,5,5-trimethyl-7-cyanoheptene-(3)-one-(2).

7. An unsaturated carbonyl group containing nitrile according to claim 1 designated 2,6,6-trimethyl-8-cyanooctene-(4)-one-(3).

8. An unsaturated carbonyl group containing nitrile according to claim 1 designated phenyl-(3,3-dimethyl-5-cyanopentene-(1)-yl)-ketone.

9. An unsaturated carbonyl group containing nitrile according to claim 1 designated 2-(2,2-dimethyl-4-cyano-butylidene)-cyclohexanone.

10. Process for the preparation of an unsaturated carbonyl group containing nitrile of the formula:

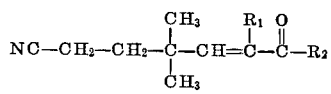

wherein $R_1$ and $R_2$ are each a member selected from the group consisting of hydrogen, alkyl containing 1 to 4 carbon atoms phenyl and benzyl and wherein $R_1$ and $R_2$ together can be cojoined to for ma cyclobutyl, cyclopentyl or cyclohexyl ring which comprises reacting at a temperature of from −10 to 100° C. α,α-dimethyl-γ-cyanobutyraldehyde with a member selected from the group consisting of aldehydes and ketones containing a methyl or methylene group and the requisite substituents to yield the above defined $R_1$ and $R_2$ in the presence of 0.03 to 5 mol-percent referred to said α,α-dimethyl-γ-cyanobutyraldehyde of a basic condensing agent and recovering said nitrile in a yield greater than 60 percent based on the amount of said α,α-dimethyl-γ-cyanobutyraldehyde reacted.

11. Process according to claim 10 wherein said basic condensing agent is a member selected from the group consisting of alkali metal hydroxides, carbonates, alcoholates, hydrides and amides, alkaline earth metal hydroxides and alcoholates, tertiary amines and quaternary ammonium hydroxides.

12. Process according to claim 10 wherein said basic condensing agent is used in an amount of 0.08 to 3-mole-percent referred to said α,α-dimethyl-γ-cyanobutyraldehyde.

13. Process according to claim 10 wherein as basic condensing agent a basic ion exchanger is employed.

14. Process according to claim 10 wherein said reaction is effected in the presence of an inert solvent.

References Cited

UNITED STATES PATENTS

| | | | |
|---|---|---|---|
| 2,564,131 | 8/1951 | Schreyer | 260—465.9 X |
| 2,969,359 | 1/1961 | De Benneville | 260—593 X |
| 3,060,236 | 10/1962 | Kollar et al. | 260—465.9 X |

FOREIGN PATENTS

| | | |
|---|---|---|
| 779,910 | 3/1968 | Canada. |

CHARLES B. PARKER, Primary Examiner

D. H. TORRENCE, Assistant Examiner

U.S. Cl. X.R.

260—294.7, 465, 465.9, 466, 566